J. N. Deck,
Water Closet Valve.
No. 98,153. Patented Dec. 21. 1869.
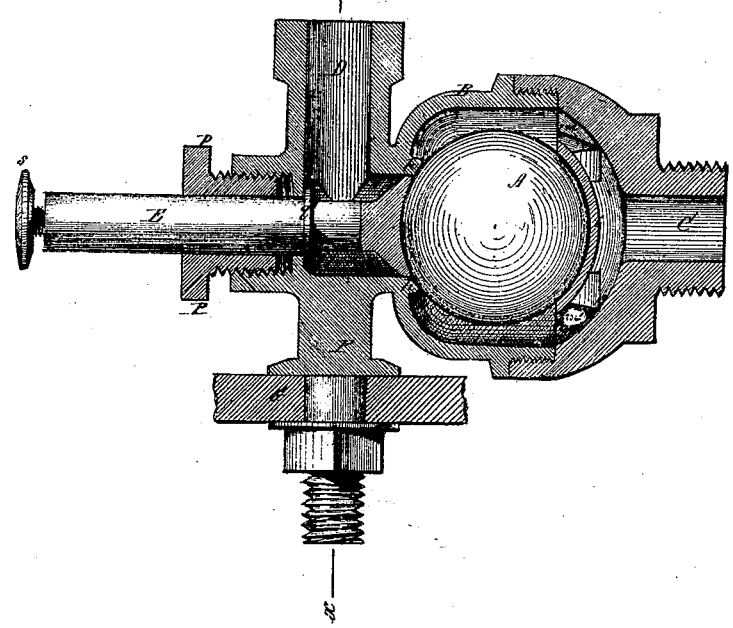
Fig. I.
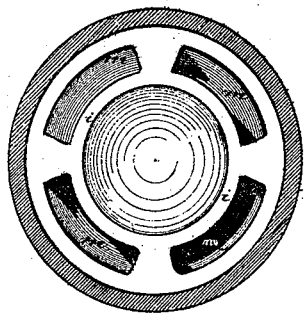
Fig. II.
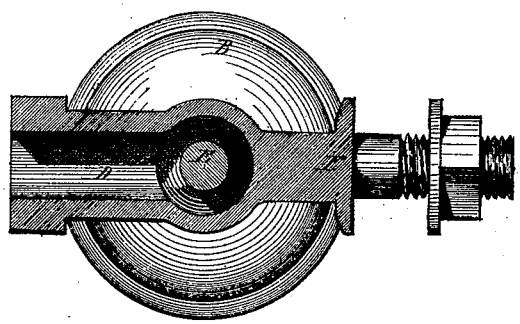
Fig. III.
Witnesses.
Jacob N. Deck, Inventor.
by Furnish & Hyatt, Atty's

United States Patent Office.

JACOB N. DECK, OF BUFFALO, NEW YORK, ASSIGNOR TO HIMSELF, B. R. COLE, AND G. FRANCIS DECK, OF SAME PLACE.

Letters Patent No. 98,153, dated December 21, 1869.

IMPROVEMENT IN WATER-CLOSET VALVES.

The Schedule referred to in these Letters Patent and making part of the same.

To all whom it may concern:

Be it known that I, JACOB N. DECK, of the city of Buffalo, in the county of Erie, and State of New York, have invented a certain new and improved Water-Closet Valve; and I do hereby declare that the following is a full and exact description thereof, reference being had to the accompanying drawings, making part of this specification.

My invention relates to that class of water-valves in which the valve is opened by means of a piston-rod, and automatically closed by the action of a spiral spring, when the force applied to the actuating-rod is removed.

My invention consists in the use and arrangement of a hollow or compressible rubber, or other elastic ball, which, in its normal situation, presses against the valve-seat, and shuts off the flow of the water, and which is removed from contact with its seat by being compressed by a piston-rod, the elasticity of the ball causing it to resume its proper shape and position against the seat, when the pressure is removed, thereby automatically closing the valve, and shutting off the escape.

In the accompanying drawings—

Figure I is a section of my improved valve, in line of the actuating-rod, and through the induction and eduction-passages.

Figure II is a cross-section of the valve, showing the induction-ports, and bearing-surface opposite the valve-seat.

Figure III is a section at right angles to that of Fig. I, and in line $x\,x$ of that figure.

Like letters of reference designate like parts in each of the figures.

A is the rubber ball;
B, the valve-case;
C, the induction-passage;
D, the eduction-passage;
E, the piston or actuating-rod; and
F, the shank which secures the valve to its support, G, in the ordinary manner.

The valve is cast in two portions, to permit the introduction of the ball, the half opposite the valve-seat, $h$, being provided with a bearing-surface, $i$, which presses the ball against its seat, when the two parts of the case are screwed together.

Outside of this bearing $i$, are formed the ports $m\,m$, through which the water from the induction-passage enters the valve-space $n$, surrounding the ball, which only partially fills the case, as shown.

P represents the packing for the piston.

$q$, a collar formed on the latter, to prevent its backward withdrawal from the valve; and $s$, an adjusting-head, by which the length of the rod can be regulated in adapting the valve to the various forms of water-closets, to which it is applicable.

The operation of my valve, constructed as before described, is obvious.

The ball being in the position shown in Fig. I, prevents the water, which enters the valve through the ports $m$, from escaping, until the ball is unseated by the pressure of the piston, which partially compresses it, or causes it to collapse sufficiently to permit the flow of the liquid.

The great and manifest advantages of my improvement are its cheapness, simplicity, durability, and non-liability to get out of order.

What I claim as my invention, and desire to secure by Letters Patent, is—

The rubber or other elastic ball A, arranged with the seat $h$ and bearing $i$, so as to be pressed from the valve-seat by a thrust, substantially as set forth.

JACOB N. DECK.

Witnesses:
W. H. FORBUSH,
JNO. J. BONNER.